United States Patent [19]
Ureshino et al.

[11] Patent Number: 5,770,236
[45] Date of Patent: Jun. 23, 1998

[54] POST-CURE INFLATOR

[75] Inventors: Kashiro Ureshino; Hisaaki Onishi; Hisashi Mitamura, all of Takasago, Japan

[73] Assignee: Kabushiki Kaisha Kobe Seiko Sho, Kobe, Japan

[21] Appl. No.: 729,528

[22] Filed: Oct. 11, 1996

[30]         Foreign Application Priority Data

Oct. 11, 1997    [JP]    Japan ..................................... 7-290297

[51] Int. Cl.$^6$ ................................................... B29C 35/16
[52] U.S. Cl. ........................................................... 425/58.1
[58] Field of Search .................................. 425/28.1, 58.1

[56]                 References Cited

U.S. PATENT DOCUMENTS

| | | | |
|---|---|---|---|
| 4,124,337 | 11/1978 | Martin ..................................... | 425/58.1 |
| 4,944,951 | 7/1990 | Katayama et al. ...................... | 425/58.1 |
| 5,352,104 | 10/1994 | Ichikawa et al. ....................... | 425/58.1 |

FOREIGN PATENT DOCUMENTS 63-264307   11/1988   Japan ..................................... 425/58.1

937216   6/1982   U.S.S.R. ................................. 425/58.1

*Primary Examiner*—James P. Mackey
*Attorney, Agent, or Firm*—Oblon, Spivak, McClelland, Maier & Neustadt, P.C.

[57]                 ABSTRACT

A post-cure inflator for inflating and cooling a vulcanized tire is disclosed. A lower rim mechanism is easily and certainly fixed, the whole apparatus is miniaturized, and the degree of freedom in designing when the lower rim mechanism is moved is made higher. The lower rim mechanism is lifted so that a locking shaft attached to an upper rim mechanism enters a fitting portion of the lower rim mechanism. After that, the locking shaft is rotated to be engaged with the lower rim mechanism, thereby connecting the lower rim mechanism via the locking shaft to the upper rim mechanism. A tire is inflated and cooled while being held by the upper and lower rim mechanisms. Guide plates are fixed to the upper rim mechanism so as to be along the locking shaft. Insertion grooves are formed in the lower rim mechanism. When the locking shaft enters the fitting portion, the guide plates are inserted into the insertion grooves.

5 Claims, 5 Drawing Sheets

POST-CURE INFLATOR

BACKGROUND OF THE INVENTION

1. Field of the Invention

The present invention relates to a post-cure inflator for inflating and cooling a vulcanized tire (hereinafter, referred to as a "tire").

2. Description of the Related Art

According to a post-cure inflator, one side of a tire is held by an upper rim mechanism and the other side is held by a lower rim mechanism. Air is supplied into the tire which is sealed by the upper and lower rim mechanisms, thereby inflating and cooling the tire. In recent years, a structure of a vertical turnover type is often used. In the structure, two sets each comprising the upper rim mechanism and the lower rim mechanism are prepared for one cavity of a tire vulcanizer, so that the inflating and cooling time of tire is equal to one or more cycles of the tire vulcanizer. The upper and lower rim mechanisms are alternately turned over in the vertical direction around the center position between the upper and lower rim mechanism as a center.

Figure 5:
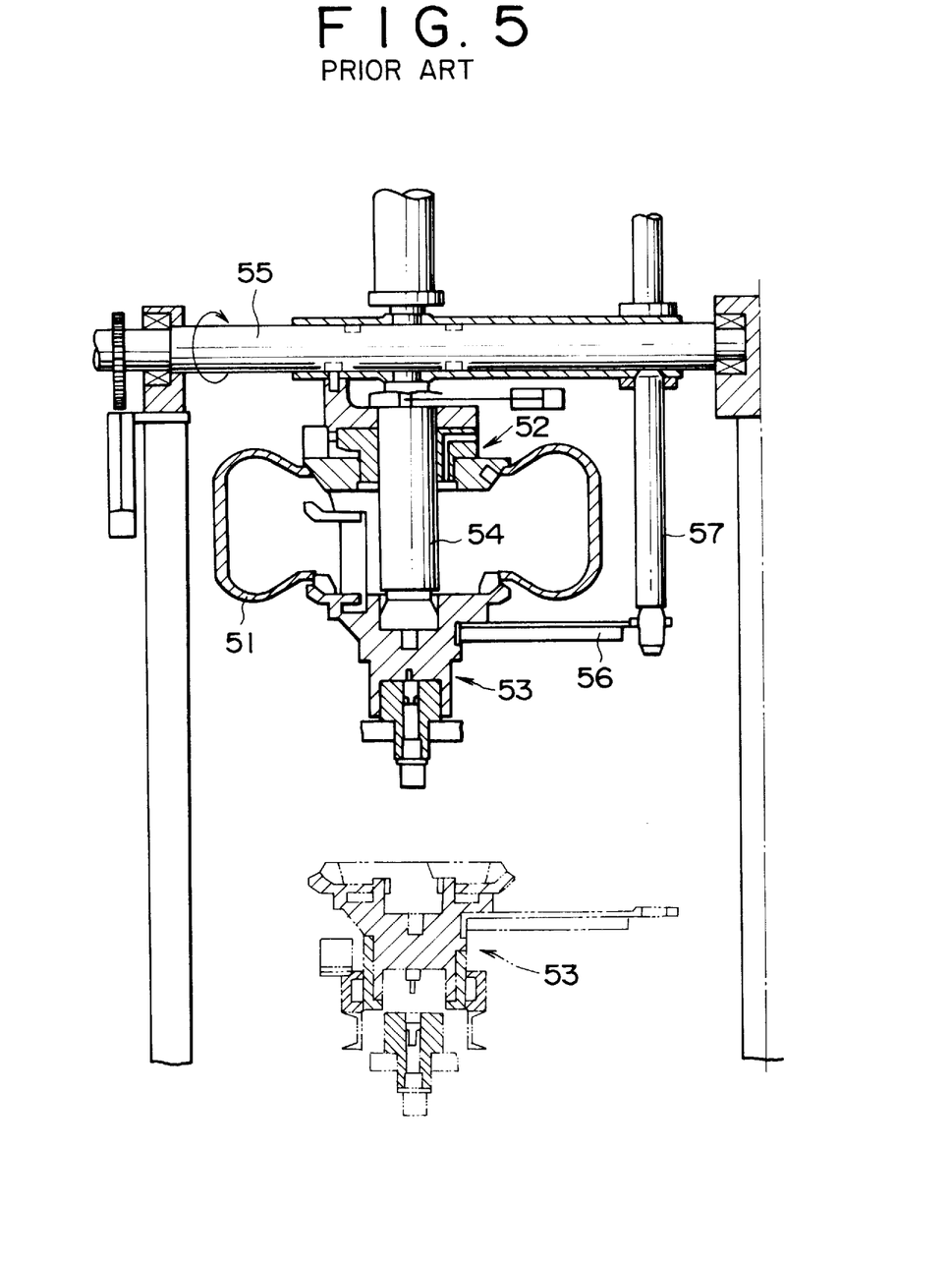
FIG. 5 is a schematic diagram of a conventional post-cure inflator.

In a conventional post-cure inflator as shown in FIG. 5, a lower rim mechanism 53 holding the lower side face of a tire 51 which is arranged horizontally is lifted from a position shown by an alternate long and two short dashes line to a position shown by a solid line, so that the upper side face of the tire 51 is held by an upper rim mechanism 52. After that, a locking shaft 54 attached to the center of the upper rim mechanism 52 is rotated so as to be engaged with the lower rim mechanism 53. Consequently, the upper rim mechanism 52 and the lower rim mechanism 53 are connected. By rotating a rotary shaft 55, the rim mechanisms 52 and 53 are turned over with the tire 51.

In this case, when the air pressure to the tire is insufficient or when the upper rim mechanism 52 and the lower rim mechanism 53 are lifted without holding the tire 51, even if the locking shaft 54 is fixed, the lower rim mechanism 53 may be turned around the locking shaft 54. There is, consequently, a fear such that the lower rim mechanism 53 and the locking shaft 54 are disengaged and the lower rim mechanism 53 comes off. In the conventional post-cure inflator, a turn-stop arm 56 is horizontally provided from the lower rim mechanism 53 and a turn-stop bar 57 is provided from the rotary shaft 55 toward the end of the turn-stop arm 56. When the lower rim mechanism 53 is connected to the upper rim mechanism 52, the turn-stop bar 57 is engaged with the turn-stop arm 56 so that the lower rim mechanism 53 is prevented from being rotated.

However, in the conventional structure, it is necessary to engage the turn-stop arm 56 with the turn-stop bar 57 at a position where the tire 51 is unloaded. Therefore, the length of the turn-stop arm 56 and the turn-stop bar 57 has to be long. This causes problems such that positioning of them upon engagement is difficult, and since a space for the turn-stop arm 56 has to be secured, the whole apparatus is accordingly large. High processing and assembling accuracy of the whole apparatus is required in order to certainly engage the turn-stop arm 56 with the turn-stop bar 57, and it causes another problem of high costs. There is another problem such that, for example, in a design specification where the lower rim mechanism 53 is horizontally moved, the long turn-stop arm 56 disturbs the horizontal movement of the mechanism 53, so that the degree of freedom in designing is lowered.

SUMMARY OF THE INVENTION

It is, therefore, an object of the invention to provide a post-cure inflator in which a lower rim mechanism is easily and certainly fixed, a whole apparatus is miniaturized, and the degree of freedom in designing when the lower rim mechanism is moved is made higher.

The above object is achieved by a post-cure inflator in which a lower rim mechanism is lifted so that a locking shaft attached to an upper rim mechanism enters a fitting portion of the lower rim mechanism. After that, the locking shaft is rotated to be engaged with the lower rim mechanism, thereby connecting the lower rim mechanism via the locking shaft to the upper rim mechanism. A vulcanized tire is inflated and cooled while being held by the upper and lower rim mechanisms. The post-cure inflator has the following features.

Guide plates are fixed to the upper rim mechanism so as to be along the locking shaft and notches into which the guide plates are inserted are formed in the lower arm mechanism when the locking shaft enters the fitting portion.

According to the structure, when the lower and upper rim mechanisms are connected via the locking shaft, the guide plates fixed to the upper rim mechanism are in a state where they are inserted into the notches of the lower rim mechanism. Therefore, the guide plates come into contact with the side faces of the notches, thereby preventing the rotation of the lower rim mechanism. In this case, since the guide plates are extended along the locking shaft, the notches through which the locking shaft passes are formed near the fitting portion that the locking shaft enters. Consequently, the mechanism to prevent the rotation of the lower rim mechanism is positioned on the inner rim side of the lower rim mechanism. For example, in case of a design specification where the lower rim mechanism is horizontally moved, the conventionally used turn-stop arm is unnecessary, so that the designing can have a higher degree of freedom. Since it is unnecessary to assure the space conventionally needed for the turn-stop arm, the whole apparatus is miniaturized. Further, the guide plates are inserted into the notches at positions in the center space of the tire, so that positioning is easy. Since high processing and assembling accuracy of the whole apparatus is not required, the costs can be accordingly saved.

Preferably, in the foregoing post-cure inflator, two sets each comprising the upper rim mechanism and the lower rim mechanism are turned over in a state where the upper and lower rim mechanisms are connected by the locking shaft, and a buffering member is provided at least one of the front end face of the locking shaft and the bottom face of the fitting portion.

With such a structure, at the time of the turnover of the upper and lower rim mechanisms, when the lower rim mechanism is moved towards the upper rim mechanism and the fitting portion of the lower rim mechanism comes into contact with the locking shaft, the buffer member absorbs the mechanical shock upon collision. Consequently, the shock to the locking shaft, lower rim mechanism, and upper rim mechanism can be reduced. Further, there is an effect such that failure and noises of the post-cure inflator can be prevented.

DETAILED DESCRIPTION OF THE PREFERRED EMBODIMENT

An embodiment of the invention will be described with reference to FIGS. 1 to 4.

Figure 1:
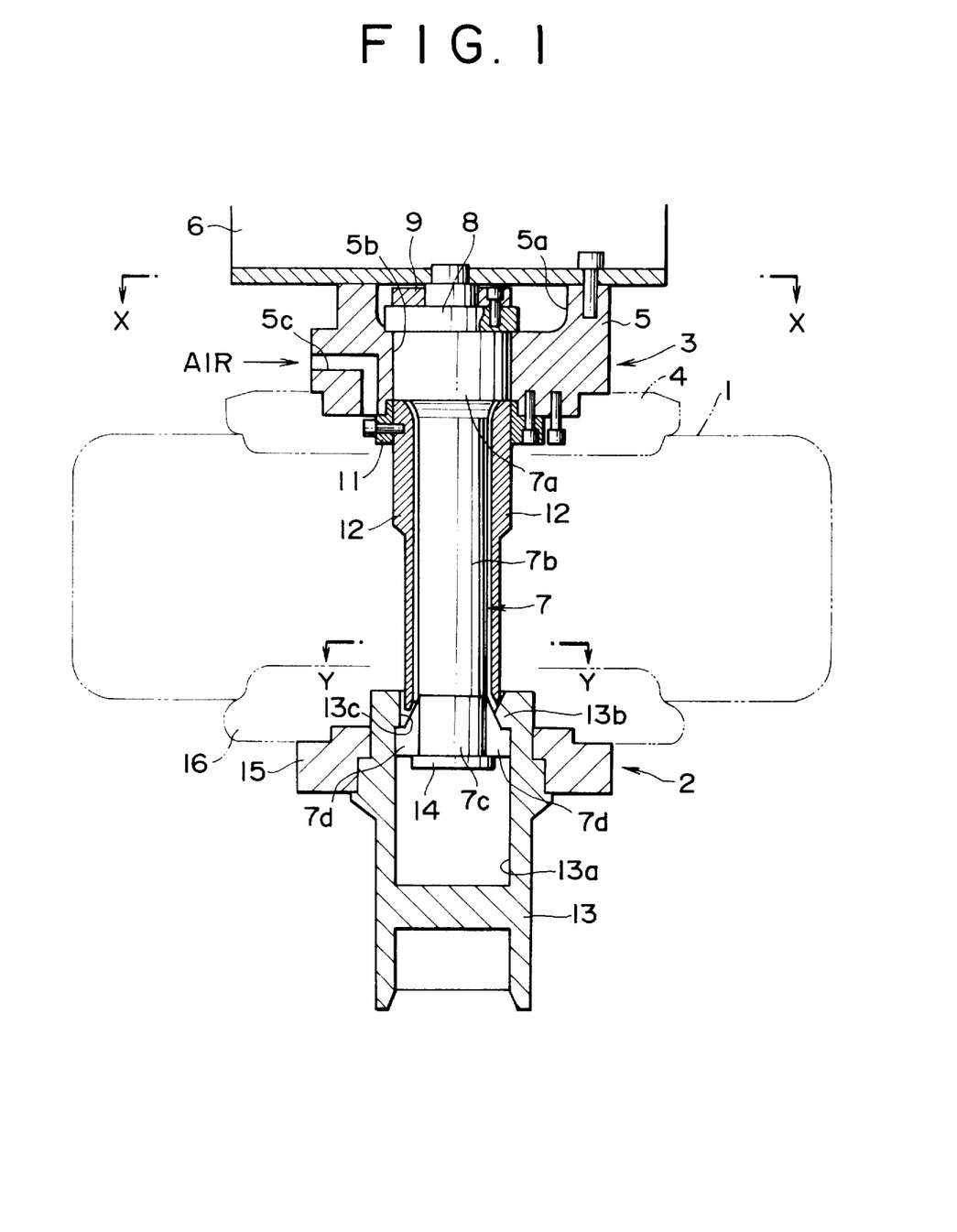
FIG. 1 is a longitudinal sectional view of a post-cure inflator.

As shown in FIG. 1, a post-cure inflator according to the embodiment has a first or lower rim mechanism 2 which holds the lower-side face of a horizontally arranged tire 1 and a second or upper rim mechanism 3 which holds the upper-side face of the tire 1. The upper rim mechanism 3 comprises a second or upper rim 4 which holds the bead of the tire 1 and an upper rim supporting member 5 which supports the upper rim 4 and is fixed to a center frame 6. An air introducing hole 5c is formed in the upper rim supporting member 5 so as to be communicated with the side face and the lower face of the member 5. The air introducing hole 5c introduces compressed air from an air supplying device (not shown) such as a compressor into the tire 1.

Figure 2:
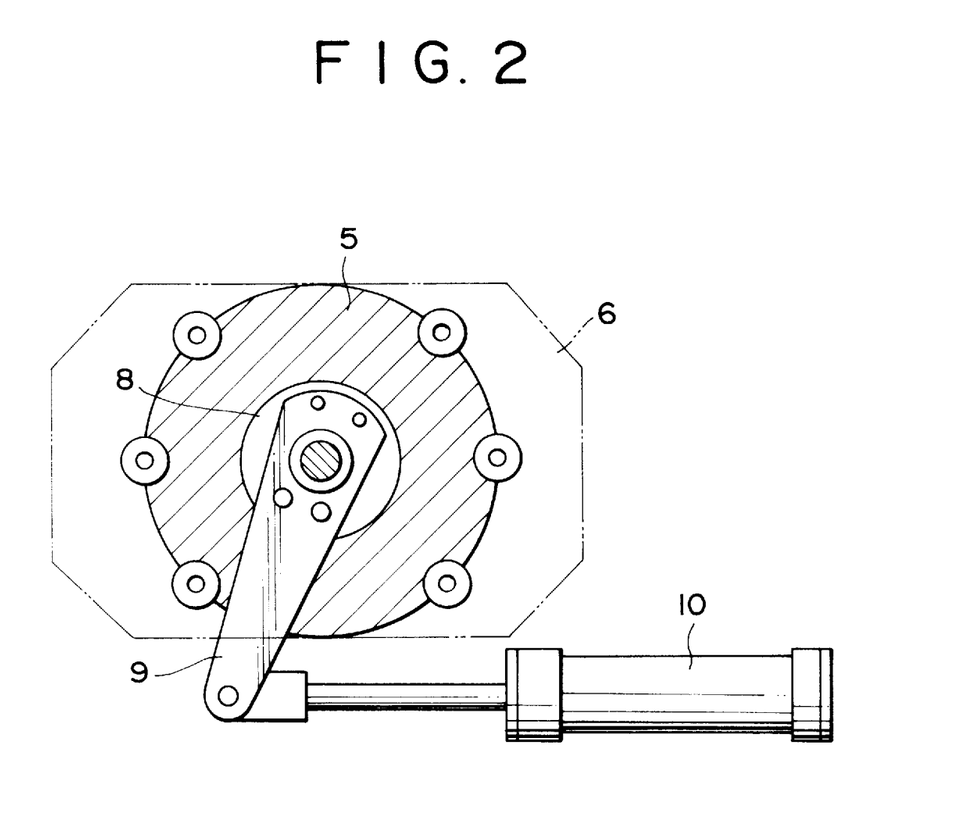
FIG. 2 is a sectional view taken on line X—X of the post-cure inflator in FIG. 1.

A concave portion 5a is formed on the top face of the upper rim supporting member 5 so as to made a space with the center frame 6. A through hole 5b which is opened on the bottom face of the concave portion 5a and on the under face of the upper rim supporting member 5 is formed. A sliding portion 7a of a locking shaft 7 is rotatably fit into the through hole 5b. A shaft supporting member 8 having a diameter larger than that of the locking shaft 7 is attached to the top face of the sliding portion 7a. The shaft supporting member 8 is located in the concave portion 5a of the upper rim supporting member 5. The lower end of the shaft supporting member 8 comes into contact with the bottom face of the concave portion 5a, thereby preventing the locking shaft 7 from falling down from the upper rim supporting member 5. As shown in FIG. 2, a locking lever 9 which is turned by a locking cylinder 10 is attached on the top face of the shaft supporting member 8. As shown in FIG. 1, the locking lever 9 rotates the locking shaft 7 via the shaft supporting member 8 in the forward and reverse directions.

The locking shaft 7 comprises: the sliding portion 7a which passes through the through hole 5b of the upper rim supporting member 5 as described above; a shaft portion 7b extending downward from the sliding portion 7a; and an engagement portion 7c which is formed on the lower end of the shaft portion 7b. The engagement portion 7c has at least one non-circular parts such as a projection, in particular four first projecting portions 7d . . . projected toward the outside. The shaft portion 7b passes through a retaining ring 11 fixed to the under surface of the upper rim supporting member 5. A pair of guide plates 12—12 are fixed to the retaining ring 11 on the right and left sides with respect to the locking shaft 7 as a center. The guide plates 12—12 are extended downward along the shaft portion 7b until the lower ends are positioned near the engagement portion 7c.

Figure 3:
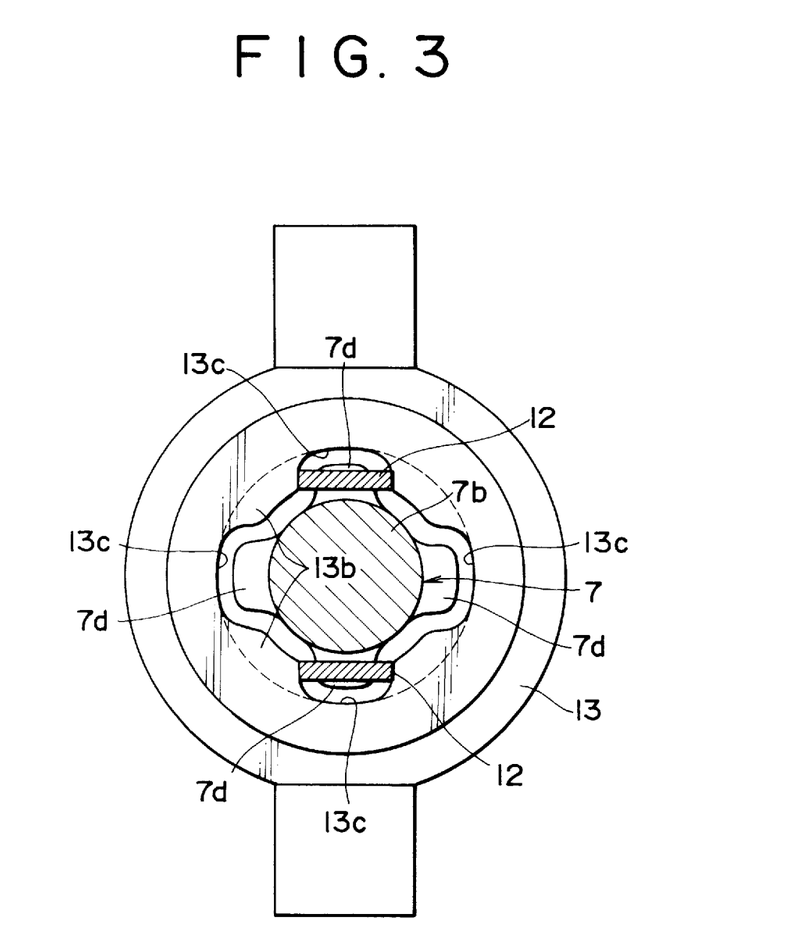
FIG. 3 is a sectional view taken on line Y—Y of the post-cure inflator in FIG. 1.

The engagement portion 7c of the locking shaft 7 is engaged with a lower rim supporting member 13, thereby connecting the upper rim mechanism 3 and the lower rim mechanism 2. The lower rim mechanism 2 includes the lower rim supporting member 13, a member 15 which is fixed to the lower rim supporting member 13, and a first or lower rim 16 which holds the bead portion of the tire 1. The lower rim supporting member 13 has a fitting portion 13a into which the engagement portion 7c of the locking shaft 7 is inserted. As shown in FIG. 3, second retaining portions 13b . . . are projected from at least two, in particular four, positions on the side wall face of the fitting portion 13a toward the inside are formed. Each of insertion grooves 13c . . . (notched portions) is formed between the adjacent retaining portions 13b—18b. The insertion grooves 13c . . . are formed so as to pass the projecting portions 7d of the locking shaft 7 when the lower rim mechanism 2 is lifted. The projecting portions 7d pass through the insertion grooves 13c, enter the fitting portion 13a, and are located under the retaining portions 13b by a rotation and come into contact with the retaining portions 13b. Thus, the locking shaft 7 is engaged with the lower rim supporting member 13.

When the locking shaft 7 enters the fitting portion 13a by a rise of the upper rim mechanism 3, the guide plates 12 are inserted into the insertion grooves 13c. While the upper end of each guide plate 12 is fixed to the upper rim supporting member 5, the lower end comes into contact with the side face of the retaining portion 13b, thereby fixing the upper rim supporting member 5 and the lower rim supporting member 13 and preventing the rotation of the upper rim mechanism 3. A buffer member 14 comprising an elastic member such as a rubber or an oleo damper is attached to the under face of the engagement portion 7c as an end face of the locking shaft 7. When the lower rim mechanism 2 and the upper rim mechanism 3 are turned over and the lower rim mechanism 2 is positioned above the upper rim mechanism 3, the buffer member 14 absorbs a mechanical shock when the fitting portion 13a of the lower rim supporting member 13 collides with the locking shaft 7.

The operation of the post-cure inflator with the above structure will be described.

The lower rim mechanism 2 is horizontally moved toward a tire vulcanizer (not shown) and the vulcanized tire 1 is transferred from the tire vulcanizer to the lower rim mechanism 2. The lower rim mechanism 2 is horizontally moved with the tire 1 so as to be positioned below the upper rim mechanism 3. Since no member which is projected from the lower rim 16 is attached to the lower rim mechanism 2, the passing route of the lower rim mechanism 2 can be designed in correspondence to the outer shape of the lower rim 16. Consequently, the post-cure inflator has a high degree of freedom in designing when the lower rim mechanism 2 is horizontally moved.

Figure 4:
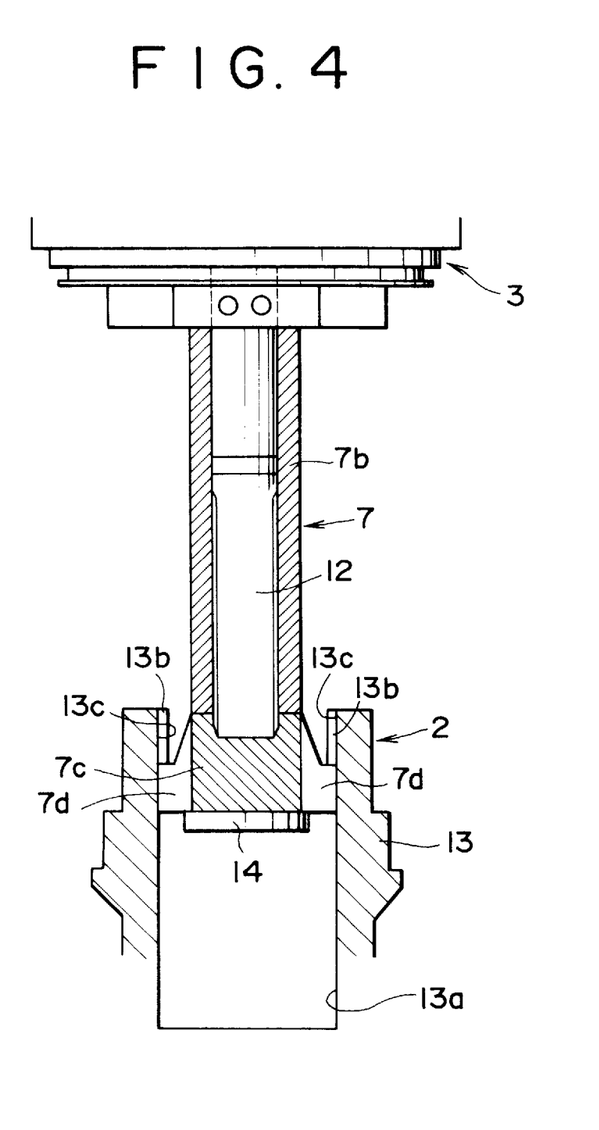
FIG. 4 is a front view of the post-cure inflator in which a part is omitted.

When the lower rim mechanism 2 is positioned below the upper rim mechanism 3 as mentioned above, the lower rim mechanism 2 is raised toward the upper rim mechanism 3 by an elevating device (not shown) in a state where the lower rim mechanism 2 holds the tire 1. As shown in FIG. 4, the projecting portions 7d of the locking shaft 7 pass through the insertion grooves 13c of the lower rim supporting member 13 and enter the fitting portion 13a. The lower ends of the guide plates 12—12 which are extended downward along the locking shaft 7 are positioned in the insertion grooves 13c—13c.

The locking cylinder 10 shown in FIG. 2 turns the locking lever 9, thereby rotating the locking shaft 7. The projecting portions 7d are moved from the positions below the insertion groove 13c to positions under the retaining portions 13b. After that, the elevating device (not shown) is moved downward. As shown in FIG. 1, when the lower rim supporting member 13 is moved downward with the elevating device, the retaining portions 13b of the lower rim supporting member 13 come into contact with the projecting portions 7d of the locking shaft 7, so that the lower rim supporting member 13 is engaged with the locking shaft 7. When air is supplied into the tire 1 via the air introducing hole 5c of the upper rim supporting member 5, the tire 1 is inflated. The lower rim supporting member 13 is energized so that the retaining portions 13b are firmly come into contact with the projecting portions 7d. Thus, the lower rim supporting member 13 is firmly engaged with the locking shaft 7.

When the lower rim supporting member 13 and the upper rim supporting member 5 are connected via the locking shaft 7 by the engagement of the lower rim supporting member 13 and the locking shaft 7, the center frame 6 is rotated. Consequently, the lower rim supporting member 13 and the upper rim supporting member 5 are turned over so that their positional relation is reversed in the vertical direction. When the pressure of air in the tire 1 is insufficient or the tire 1 is not held in this instance, the lower rim supporting member 13 is moved toward the upper rim supporting member 5 and the retaining portions 13b of the lower rim supporting member 13 are apart from the projecting portions 7d of the locking shaft 7. Since the guide plates 12 fixed to the upper rim supporting member 5 are inserted into the insertion grooves 13c, the lower rim supporting member 13 is not rotated with respect to the upper rim supporting member 5 and the locking shaft 7. Therefore, even when the lower rim supporting member 13 is moved in the direction opposite to the upper rim supporting member 5 due to vibration or the like upon turnover, since the retaining portions 13b of the lower rim supporting member 13 always come into contact with the projecting portions 7d of the locking shaft 7, the lower rim supporting member 13 does not come off.

When the lower rim supporting member 13 is moved toward the upper rim supporting member 5 at the time of the turnover, there is a case where the fitting portion 13a comes into contact with the engagement portion 7c of the locking shaft 7. In this case, the buffer member 14 attached to the engagement portion 7c absorbs the mechanical shock upon collision, so that the shock casting on the locking shaft 7, lower rim mechanism 2, and upper rim mechanism 3 is little. Consequently, failure or noise of the post-cure inflator is reduced.

Although the structure of the vertical turnover type in which two sets each comprising the lower rim mechanism 2 and the upper rim mechanism 3 are prepared for one cavity and the positional relation between the mechanisms 2 and 3 is alternately reversed has been described in the embodiment, the invention is not limited to such a structure. That is, even in a structure where a set of the lower rim mechanism 2 and the upper rim mechanism 3 is prepared for one cavity and the positional relation between the upper rim mechanism 3 and the lower rim mechanism 2 is not reversed, by inserting the guide plates 12 into the fitting portion 13a of the lower rim supporting member 13, the rotation of the lower rim mechanism 2 due to vibration or the like is prevented and the lower rim mechanism 2 is prevented from being come off.

Although the space between the retaining portions 13b—13b is used as the insertion groove 13c into which the guide plate 12 is inserted in the embodiment, the invention is not limited to the insertion groove 13c. A through hole opened in the retaining portion 13b can be also used. Although the buffer member 14 of the embodiment is attached to the front end face of the locking shaft 7, it can be also attached to the bottom face of the fitting portion 13a.

According to the post-cure inflator as mentioned above, the lower rim mechanism is lifted so that the locking shaft attached to the upper rim mechanism enters the fitting portion of the lower rim mechanism. After that, the locking shaft is rotated to be engaged with the lower rim mechanism, thereby connecting the lower rim mechanism via the locking shaft to the upper rim mechanism. A vulcanized tire is inflated and cooled while being held by the upper rim mechanism and the lower rim mechanism. In such a post-cure inflator, the guide plates are fixed to the upper rim mechanism so as to be along the locking shaft. The notches into which the guide plates are inserted when the locking shaft enters the fitting portion are formed in the lower rim mechanism.

That is, the mechanism to prevent the rotation of the lower rim mechanism is provided on the inner rim side of the lower rim mechanism. Therefore, for example, in case of a design specification where the lower rim mechanism is horizontally moved, since there is no need to consider the conventional turn-stop arm when designing, the designing can have a high degree of freedom. Since it is not necessary to assure the space conventionally required for the turn-stop arm, the whole apparatus can be miniaturized. Further, the guide plates are inserted into the notches in the center space of the tire, so that positioning when the guide plates are inserted into the notches is easy. There is, consequently, an effect such that the high processing and assembling accuracy of the whole apparatus is not required and the costs can be accordingly saved.

Preferably, the post-cure inflator has the structure such that each of two sets each comprising the upper rim mechanism and the lower rim mechanism can be turned over in a state where the upper and lower rim mechanisms are connected by the locking shaft. The buffering member is provided at least one of the front end face of the locking shaft and the bottom face of the fitting portion.

At the time of turnover of the upper rim mechanism and the lower rim mechanism, even when the lower rim mechanism is moved toward the upper rim mechanism and the fitting portion of the lower rim mechanism comes into contact with the locking shaft, the buffering member absorbs the mechanical shock upon collision. Consequently, the shock to the locking shaft, lower rim mechanism, and upper rim mechanism can be reduced. Further, there is an effect such that failure and noise of the post-cure inflator can be prevented.

What is claimed is:

1. A post-cure inflator for inflating and curing a vulcanized tire, comprising:

a first rim mechanism comprising a first rim and a fitting portion having at least two first projections defining an insertion groove therebetween;

a second rim mechanism comprising a second rim and a locking shaft extending towards said first rim mechanism, said locking shaft being fittable in said fitting portion and having at least one second projection, wherein at least one of the first and second rim mechanisms is relatively movable in the direction of elongation of said locking shaft such that said locking shaft may be inserted into and removed from said fitting portion, and wherein said locking shaft is relatively rotatable with respect to said fitting portion such that said first and second projections may overlap one another to lock said locking shaft in said fitting portion when said locking shaft is fitted into said fitting portion; and at least one guide plate mounted to said second rim mechanism, wherein each said at least one guide plate extends toward said first rim mechanism such that said guide plate is positioned in said insertion groove when said first and second projections overlap one another to lock said locking shaft in said fitting portion.

2. The post-cure inflator of claim 1 wherein said second rim mechanism is mounted for rotation about a horizontal axis and said first rim mechanism is movable towards and away from said second rim mechanism.

3. The post-cure inflator of claim 1 including four of each of said first and second projections.

4. The post-cure inflator of claim 2 including four of each of said first and second projections.

5. The post-cure inflator of claim 2 including a buffer member positioned between said locking shaft and said fitting portion.

* * * * *

UNITED STATES PATENT AND TRADEMARK OFFICE
CERTIFICATE OF CORRECTION

PATENT NO. : 5,770,236
DATED : June 23, 1998
INVENTOR(S) : Kashiro URESHINO et al.

It is certified that error appears in the above-identified patent and that said Letters Patent is hereby corrected as shown below:

On the Title page, Item [30], the Foreign Application Priority Data date is incorrect. It should be:

--Oct. 11, 1995   [JP]   Japan............7-290297

Signed and Sealed this

Second Day of February, 1999

Attest:

Attesting Officer

*Acting Commissioner of Patents and Trademarks*